United States Patent Office 3,312,600
Patented Apr. 4, 1967

3,312,600
HEAT-PUMP COMPRESSOR TYPE DISTILLATION APPARATUS FOR PURIFYING WATER
Evans T. Morton, Milwaukee, Wis., assignor to Aqua-Chem, Inc., a corporation of Wisconsin
Filed Oct. 4, 1965, Ser. No. 495,764
7 Claims. (Cl. 202—160)

This application is a continuation-in-part of my copending application Ser. No. 239,396, filed Nov. 16, 1962, entitled, "Method and Apparatus for Purifying Liquids," now abandoned, and which is a continuation-in-part of my application Ser. No. 188,496, filed Apr. 18, 1962, entitled "Method and Apparatus for Purifying Liquids" (now abandoned).

This invention relates to methods and apparatus for removing impurities from liquids and more particularly to a novel method and apparatus for purifying water.

It is the general object of the present invention to produce a new and improved apparatus for purifying liquids.

It is a more specific object of the present invention to produce new and improved methods and apparatus for purifying water including removal of salts therefrom to render brackish, hard, or other disagreeable waters suitable for drinking.

It is a further object of the invention to provide a method for removing impurities from water by creating a recirculating current of air passing between a heating medium and a cooling medium, and entraining in the moving current of air water vapor from the water to be purified, the heating medium serving to increase the water vapor carrying capacity of the air and the cooling medium serving to condense the water out of such air.

It is another object of the present invention to provide an apparatus of the type described in respect to the method of the preceding paragraph. In one variation of the present invention an apparatus of the type described in the preceding paragraph is provided wherein a refrigeration cycle is used to provide both the heating medium and the cooling medium, the condenser coil of the refrigeration cycle serving as the heating medium and the evaporator coil as the cooling medium, refrigerant being recirculated through such a system in the normal manner.

In another variation of the present invention an apparatus of the type described in the method of the preceding paragraph is provided wherein separate and independent heating and cooling means are employed to provide the heating medium and the cooling medium.

It is also an object to provide an apparatus in accordance with the foregoing wherein power for charging water to be purified to the heating area, power for circulating the recirculating current of air, and/or power for forcing or drawing external air through the air jacket may be obtained from a single drive shaft and a single motor source.

It is an additional object of the present invention to provide methods and apparatus of the type described in the preceding objects wherein the feed or water to be purified is passed in heat exchange with the recirculating current of air, especially at or adjacent the outlet of the recirculating air from the heating area, prior to charging of the feed water to the heating area.

Still another object is to provide an apparatus or method in accordance with any of the foregoing objects including control of the purification system responsive to product conditions and/or process or apparatus conditions and more particularly to provide control of feed water responsive to heating area temperature and control of the purification of water responsive to level and/or temperature of product water in a product water storage zone.

Another object of this invention is to provide for heat conservation in the process and apparatus in accordance with any of the foregoing objects.

And another object of this invention is to provide for product pasteurization in the process or apparatus in accordance with any of the foregoing objects.

Other and further objects and advantages of the present invention will be readily apparent from the following description and drawings, in which.

Figure 1:
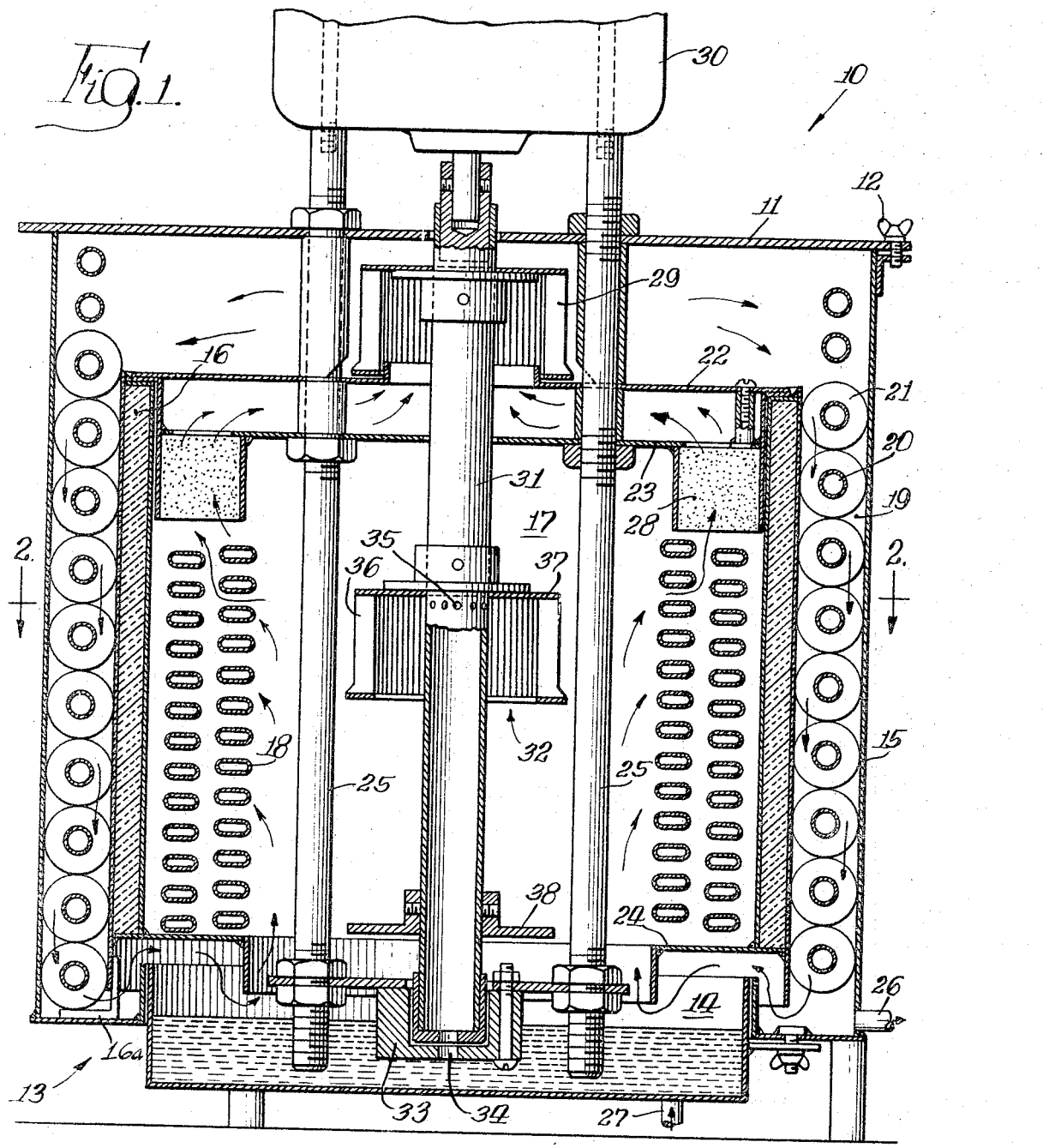
FIGURE 1 is a vertical sectional view through an apparatus embodying my invention.

While this invention is susceptible of embodiment in many different forms, there is shown in the drawings and will herein be described in detail several embodiments with the understanding that the present disclosure is to be considered as an exemplification of the principles of the invention and is not intended to limit the invention to the embodiment illustrated. The scope of the invention will be pointed out in the appended claims.

Referring now to FIGURE 1 of the drawings, there is shown a generally cylindrical housing 10 having a lid 11 secured thereto by thumbscrews 12, the housing having a bottom 13 formed to provide a well 14 therein. A cylindrical side wall 15 completes the housing.

An insulated cylindrical wall 16 divides the interior of the housing into a condenser chamber 17 having a condenser coil 18 therein and an evaporator chamber 19 having an evaporator coil 20 therein. To provide more efficient heat exchange surfaces, fins 21 may be provided on the evaporator coil 20.

The wall 16 is supported by brackets 16a which also support bottom plate 24. Spaced top plates 22 and 23 are supported on bolts 25, in turn supported by the lid 11. An outlet 26 is provided for the evaporator chamber and an inlet 27 communicates with the well 14.

Located near the upper portion of the condenser chamber 17 is an annular demister 28 forming a part of an air passage between the condenser chamber 17 and a fan or blower 29 mounted near the top of the housing. The air flow path is indicated by the arrows in FIGURE 1 and operation of the fan 29 serves to draw air over the coils 18 through the demister 28 and thence, as indicated by the arrows, into the evaporator chamber 19, air then passing from the lower portion of the evaporator chamber back into the condenser chamber, as indicated by the arrows in the lower portion of the figure.

For operating the fan 29, there is supported at the upper ends of the bolts 25, an electric motor 30 connected to drive a hollow shaft 31 rotatably supported in the housing. An atomizer 32 is mounted on the shaft 31, the atomizer serving the dual purpose to atomize water conducted thereto by means hereinafter to be described, and also to agitate the air within the condenser chamber 17 to increase its evaporative effect. The lower portion of the shaft 31 is supported in a bearing 33 with the bearing being provided with an inlet 34 communicating at one end with water in the well 14 and at the other end with the interior of the hollow shaft 31. A plurality of openings or ports 35 are provided in the shaft 31 at the location of the atomizer 32, and water issuing from the ports 35 impinges on the blades 36 of the atomizer, which blades are in turn mounted on a disc 37 forming the upper portion of the atomizing device. A circular splash or deflector plate 38 is secured to the lower portion of the shaft 31 immediately above the bearing 33. Inasmuch as rotation of the shaft causes the same to act in the nature of a pump drawing water from the well 14 for emergence from the ports 35, the pumping action thereof has been designated by the reference character 40 in FIGURE 3, reference to which may now be had for the purpose of explaining the operation of the apparatus.

As previously indicated, the principles of the present invention can readily be adapted for use in conjunction with a refrigeration cycle including a compressor 41 and an expansion valve or restriction 42 in the refrigerant line. Thus, refrigerant compressed by compressor 41 emerges therefrom at 180°–225° F. and preferably at about 195° F. and is directed first to the condenser coil 18 where it is condensed at from 100°–200° F. and preferably at between 125°–135° F., and then after passing through restriction 42 into evaporator coil 20, and thereafter returning to the intake side of the compressor 41. In the evaporating chamber, the refrigerant temperature drops to a temperature at least 10 degrees below its temperature in the condenser coil 18 and I prefer a temperature of the refrigerant in the neighborhood of 40° F. Water to be purified is introduced into the well 14 and withdrawn therefrom by the pumping action designated as 40 to issue as a spray, from the atomizer 32 against the condenser coil 18. The water is thereby heated to between 90° F. and 190° F. depending, among other things, on the temperature of the refrigerant in the condenser coil 18. With the latter in the preferred range of 125°–135° F., the water in the condenser chamber is heated to between 110°–115° F. The air within the condenser chamber 17 is similarly heated to between 110° F. and 115° F., thereby increasing not only the water vapor carrying capacity of the air but also increasing the vapor pressure of the water. The air-water-vapor mixture thus leaves the condenser chamber at a temperature of between 110° F. and 115° F. Contacting the evaporator coil 20, the air and water vapor temperature is reduced between 5 to 50 degrees, depending upon the temperature of the refrigerant. At the preferred ranges, the temperature is reduced to approximately 100° F. As a result, a portion of the water carried in the air condenses and is withdrawn through the outlet 26. Thus, the water carrying capacity of the air is increased and substantially totally utilized in the process. The fan 29 serves to withdraw the saturated air from the chamber 17 through the demister 28 and along the air passages designated as 43 to the evaporator chamber 19. Air is then recirculated back to the condenser chamber 17 at a temperature of about 100° F. by the lower air passage designated 43.

The amount of water to be purified, introduced through the inlet 27, is maintained somewhat in excess of the amount of distillate withdrawn from the outlet 26, thus providing a constant drain (indicated as 44 in FIGURE 3) from the well to prevent overconcentrating the impurities.

Figure 4:
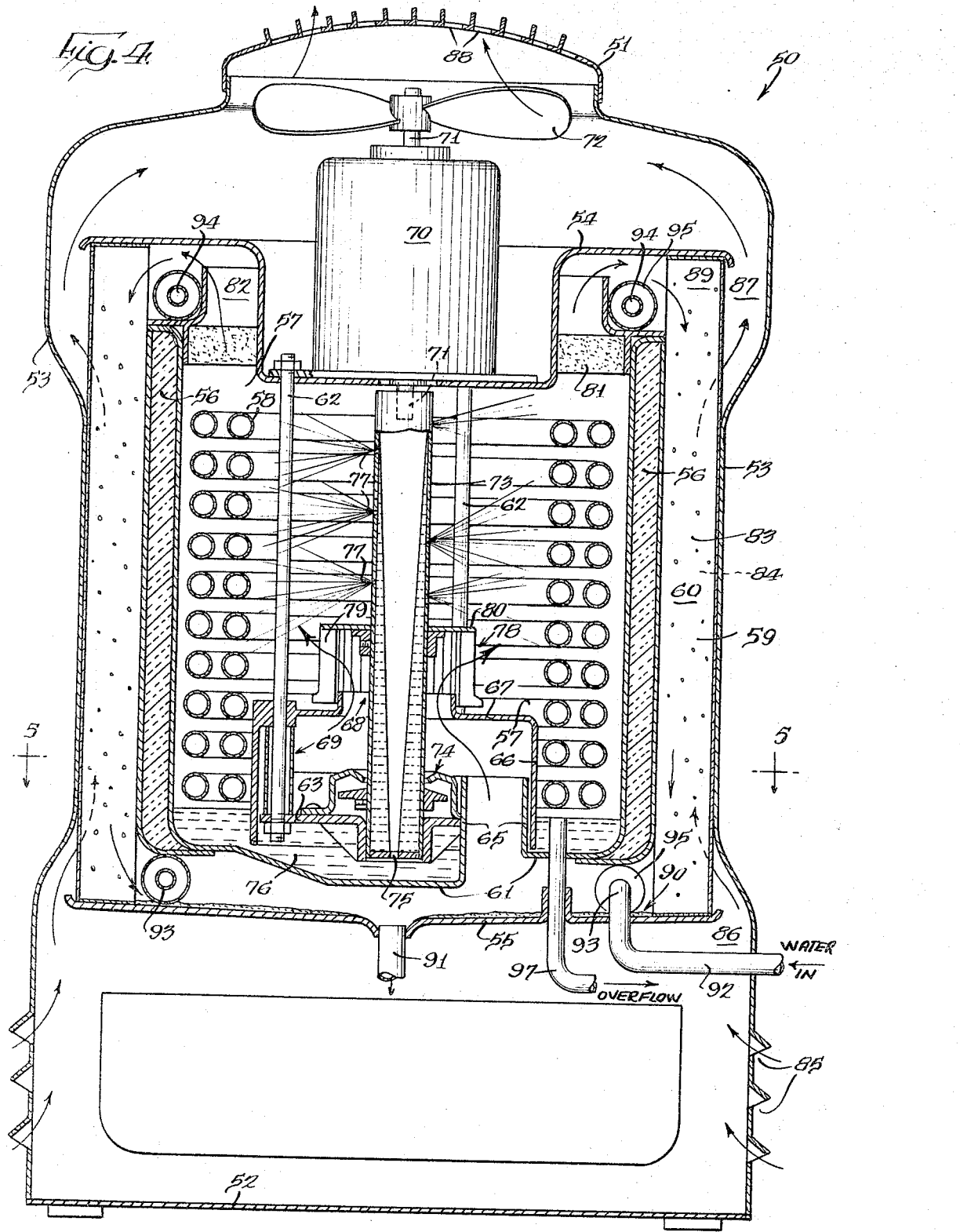
FIGURE 4 is a vertical sectional view through another apparatus embodying my invention.
Figure 5:
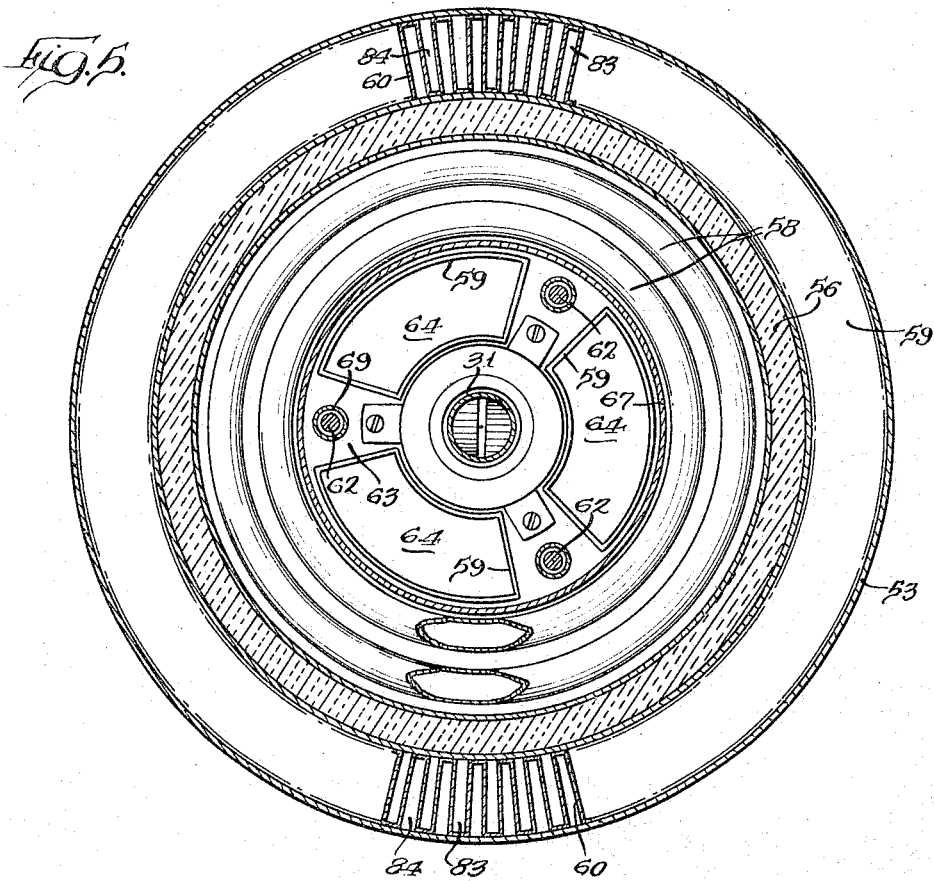
FIGURE 5 is a horizontal sectional view taken along line 5—5 of FIGURE 4.

Turning now to FIGURES 4 and 5 of the drawings, there is illustrated another form of apparatus in accordance herewith. Referring to FIGURE 4, there is shown a generally cylindrical housing 50 having a lid 51 securely fitted thereon, the housing having a bottom 52 and a generally cylindrical side wall 53 completing the housing.

Within housing 50, there is mounted a top partition 54 and a bottom partition 55, secured to side wall 53 by suitable brackets, not shown. Top partition 54 and bottom partition 55 define the top and bottom of a separation chamber. An insulated cylindrical wall 56 divides the interior of the separation chamber into a vaporizing chamber 57 having a heating tube 58 therein through which flue gas from a gas or oil fire are passed and a condensing chamber 59 having external air heat exchange cooling surfaces 60 therein. Other heating and cooling means may be used, such as heat exchange with steam or hot water and/or cold water for heating and/or cooling, as well as direct heating by electric resistance elements, or heating and cooling by a refrigerant cycle or by a thermoelectric circuit having the hot junctions disposed in chamber 57 and the cold junctions disposed in chamber 59. Alternatively, a compression cycle based on vapor absorption characteristics of air at a given temperature and pressure and condensation of water vapor from air under other pressures and temperatures can be used for heating and cooling with the compressor providing the driving force for the cyclic air stream as well as the temperature and pressure changes.

A noninsulating rear wall 61 extends inwardly from the bottom of wall 56 to provide a reservoir for water to be purified. Bolts 62 support an annular bottom plate 63 having openings 64 through which upward extensions of wall 61 project as shown at 65, defining flow passages through openings 64. Bottom plate 63 supports a generally cylindrical collar 66 having an inward annular deviation or top portion 67 with a central opening defining the vaporizing chamber inlet 68. Mounting means indicated generally at 69 secure collar 66 and bottom plate 63 to top partition 54 by means of bolt 62.

Bolt 62 also mounts motor 70 on top partition 54. Motor 70 drives a driven or drivable shaft 71 having fan 72 mounted thereon. Shaft 71 extends into vaporizing chamber 57 and has mounted thereon a rotatable cylinder 73 which is rotatably mounted at its lower end to bottom plate 63 by means of mounting brackets generally constituting a bearing assembly shown at 74. The lower portion of cylinder 73 is provided with an inlet 75 communicating at one end with water in the reservoir 76 and at the other end with the interior of the hollow cylinder 73. A plurality of openings or ports 77 are provided in cylinder 73 above impeller 78 and water issuing from the ports 77 is thrown upon heating tubes 58. The rotation of cylinder 73 causes the same to act in the nature of a pump drawing water from reservoir 76 for emergence from the ports 77.

Impeller 78 is carried by cylinder 73 and is secured thereto for rotation therewith. Impeller 78 has a plurality of blades 79 mounted on a disc 80 forming the upper portion of the impeller device. Impeller blades 79 act to impel air entering inlet 68 against heating means 58. Impeller 78 is mounted at inlet 68 for better action in circulation of air through vaporizing chamber 57.

Air circulated by impeller 78 passes over tubes 58 where water from ports 77 is vaporized and the air current picks up the water vapor as well as small droplets of water and carries the vapor upward and through annular demister 81, positioned at vaporizing chamber outlet 82, as indicated by the arrows, into condensing chamber 59. Annular demister 81 forms a part of the air passage between the vaporizing chamber 57 and the condensing chamber 59, and functions to remove small water droplets from the air current, which small water droplets fall back into vaporizing chamber 57 and onto the surface of tubes 58 or into reservoir 76.

Condensing chamber 59 includes a heat transfer sheet or plate 60 impervious to water, water vapor and air and vertically disposed within condensing chamber 59. Plate 60 is substantially convoluted providing increased condensing surface area and divides chamber 59 into a condensing area 83 and a coolant or cooling jacket area 84.

Side 53 is provided with an external air intake vent 85 through which air may be drawn by fan 72 from the exterior of housing 50. Air entering vent 85 is directed through an annular inlet 86 to cooling jacket area 84 through the cooling jacket and annular outlet 87 and is thereupon forced through outlet vents 88 in lid 51. Fan 72 is disposed in the restricted top portion of housing 50 which forms the opening covered by lid 51; such arrangement provides for efficient circulation of air through inlets 85, the cooling jacket and out of vents 88.

Air entering condensing chamber 59 at inlet 89 is directed through a condensing area 83 downwardly and withdrawn from condensing chamber outlet 90 for recirculation through vaporizing chamber inlet 68. In condensing area 83, the surface 60, maintained cool by circulation of external air at ambient temperature through jacket 84, causes condensation of water from the circulating stream of air. Condensed water is collected on bottom partition 55 and flows or is withdrawn as product through conduit 91.

Figure 6:
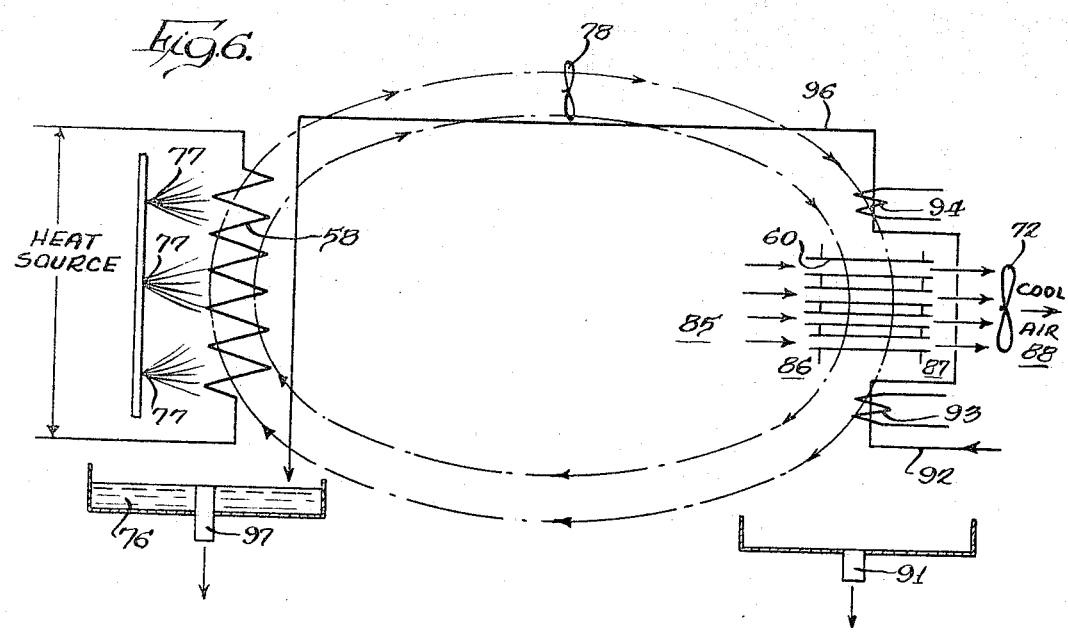
FIGURE 6 is a schematic flow diagram illustrating a form of my process as carried out in the apparatus of FIGURES 4 and 5.

Water to be purified is supplied to the low temperature still by means of conduit 92 and is preheated by being passed through conduits 93 and 94 in heat exchange first with the circulating stream of air adjacent the inlet and then with the circulating stream of air adjacent the outlet of vaporizing chamber 57, respectively. Surface fins 95 may be provided on conduits 93 and 94 for more efficient heat exchange. Heat exchange of the feed water with the outlet air from chamber 57 also serves to cool the circulating stream of air at about its entry into the condensing chamber. The feed water then passes through conduit 96 (FIGURE 6) to reservoir 76 provided with an overflow conduit 97.

In operation, water to be purified is introduced into reservoir 76 and withdrawn therefrom by the pumping action of cylinder or pump 73 as a spray from ports 77 against the heating coil 58. The water is thereby heated as is the air forced against heating coil 58 by impeller 78, increasing not only the water vapor carrying capacity of the air, but also increasing the vapor pressure of the water. The increased water carrying capacity of the air is effectively utilized in the process. The air-water-vapor mixture leaves the vaporizing chamber at an elevated temperature which may depend upon the speed of circulation of the air current and the temperature and structure of heating tubes 58. Upon contacting the condensing surface 60, the air and water vapor temperature is reduced, and as a result, a portion of the water carried in the air condenses and is withdrawn through conduit 91. The impeller 78 serves to force saturated air from the chamber 57 to the demister 81 and along the passages 83 of the condensing chamber. Air is then recirculated back to the vaporizing chamber 57 by the impeller via the air passage from 90 to 68, thus maintaining cyclic recirculation or continuous recycle of the air stream for continuous water purification.

The amount of water to be purified, introduced through the inlet 92 may be maintained somewhat in excess of the amount of distillate withdrawn from the conduit 91, thus providing a constant drain through overflow 97 to prevent overconcentrating the impurities.

Figure 2:
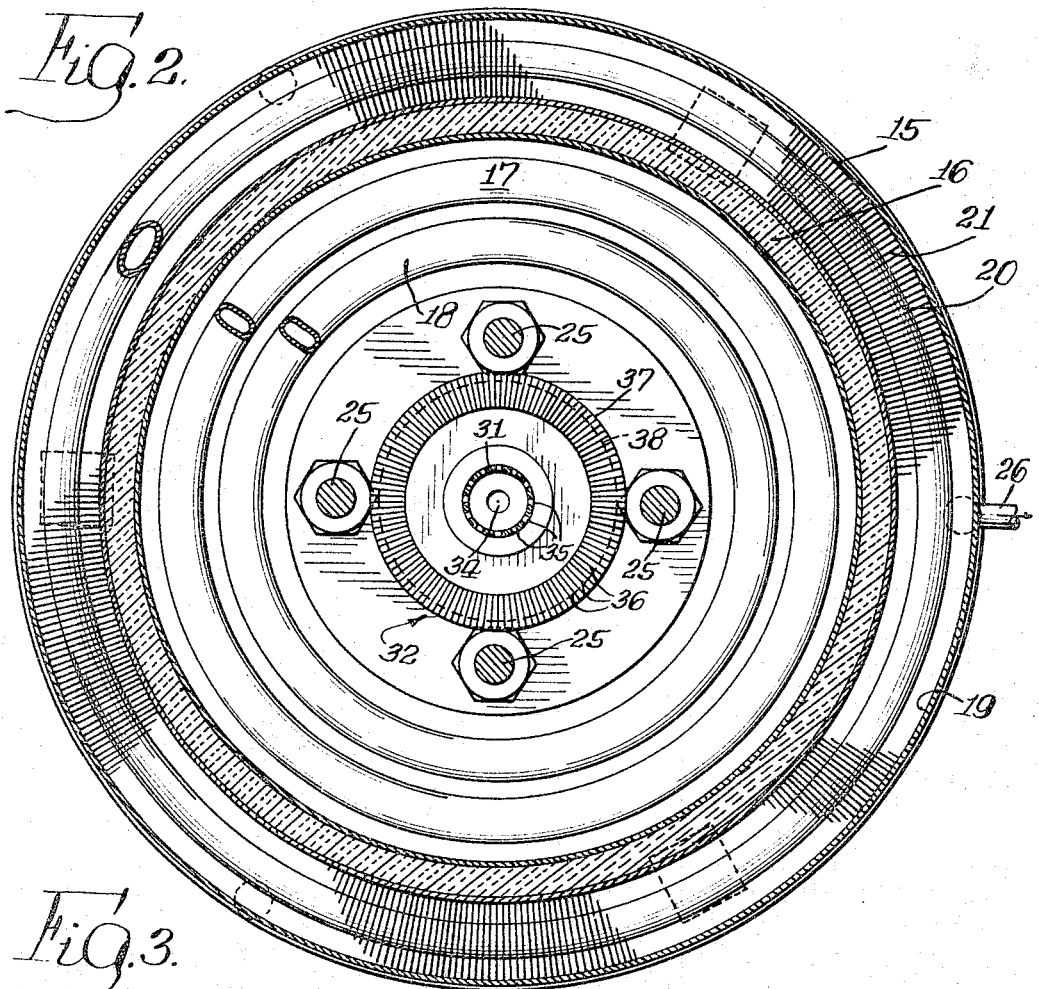
FIGURE 2 is a horizontal sectional view taken along line 2—2 of FIGURE 1.
Figure 3:
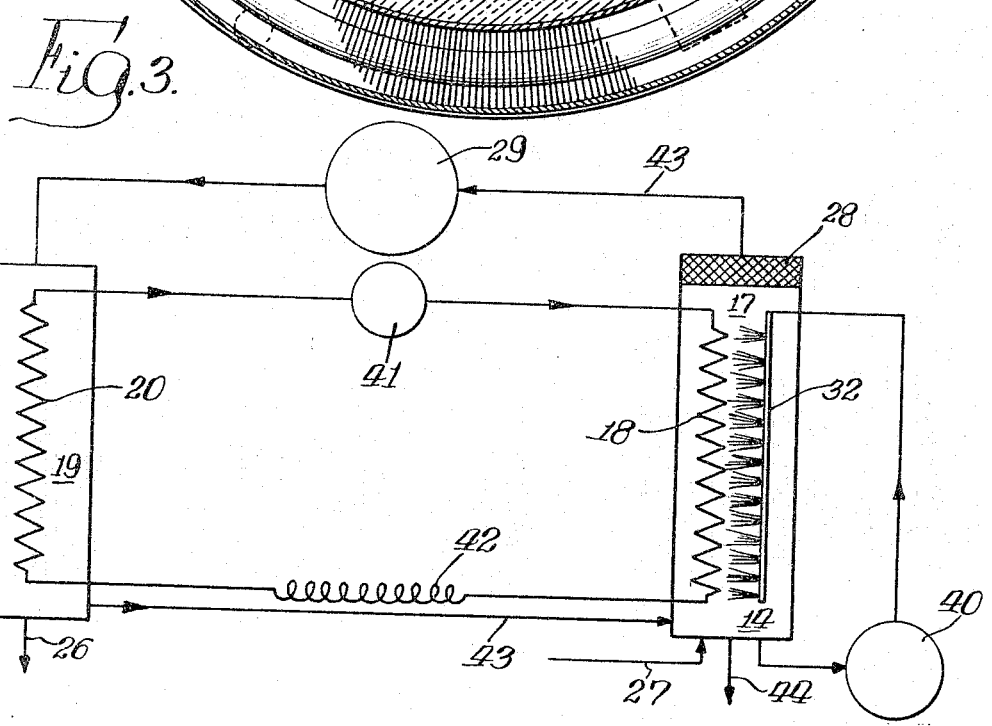
FIGURE 3 is a schematic flow diagram illustrating a form of my novel process as carried out in the apparatus of FIGURES 1 and 2.
Figure 7:
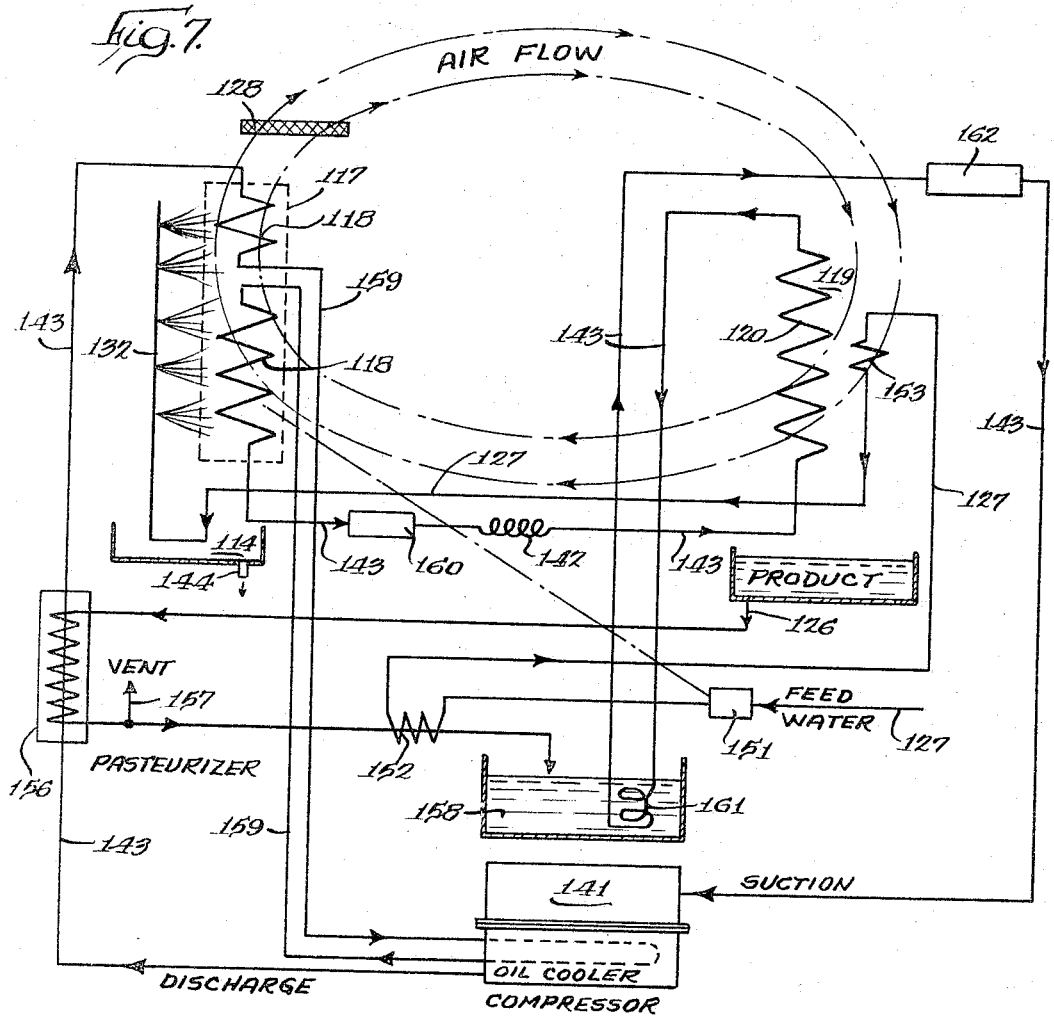
FIGURE 7 is a schematic flow diagram showing a modification of the embodiment of the process and apparatus illustrated in FIGURES 1-3.

Turning now to FIGURE 7, there is illustrated a flow scheme of another modification of a system such as is illustrated in FIGURES 1–3. The system of FIGURE 7 employs a refrigeration cycle for heating and cooling the cyclic stream of air and has been modified particularly for use in home or other low water requirement installations. For simplicity, all reference numerals lower than 150 in FIGURE 7 identify elements the same as or similar to those elements identified with reference to FIGURES 1 and 3 and having the same last two digits, e.g. the condenser chamber 117 in which the cyclic stream of air is heated by the condensing refrigerant is the same as or similar to condenser chamber 17 while evaporator chamber 119 corresponds to evaporator chamber 19, except for modifications of the elements which may be specifically referred to or illustrated in FIGURE 7.

In the system of FIGURE 7, feed water is charged through line 127 to the atomizer or spraying means 132. The passage of feed water through line 127 is controlled by flow control valve 151 which functions in response to the temperature of the water in feed container or well 114 in the condenser chamber 117. It will be apparent that the flow control valve may be used to maintain desired temperatures in condenser chamber 117 regardless of changes in environmental or water feed temperatures. The temperature responsive flow valve can be a conventional thermostatic valve much like the thermostatic valves used in automobile heater applications.

It will be clear from the foregoing that feed water may be introduced into the feed water container in response to an increase in temperature even though the water level therein may be up to the overflow. This controlled introduction of feed water serves to maintain the heat balance of the system and is one method of drawing off excess heat. Thus, as the system acquires heat (which, in the absence of the arrangement shown, would continue to increase), the excess heat is transferred to the water in the feed container, a portion of which is passed to waste.

Upon opening of valve 151 for passage of feed water to the water purifier, the water passes through heat exchanger 152 in heat exchange with product water being withdrawn via line 126 from the water collected in the evaporator chamber 119. Thereafter, the feed water passes through heat exchanger 153 in heat exchange with the cyclic stream of air flowing through the evaporator chamber and it is then charged to the water spray device 132 which sprays the water upon coil 118.

Passage of feed water through heat exchanger 153 not only serves to preheat the feed water but also increases the yield of purified water by using the cold feed to condense additional water from the cyclic air stream within air chamber 119.

The water vapors are picked up in chamber 117 by the cyclic stream of air, carried through demister 128 and into chamber 119 wherein the water is condensed and collected as product with the cyclic stream of air returning to chamber 117.

The collected water is withdrawn by means of line 126 and passed through a pasteurizer or heat exchanger 156 wherein the water is pasteurized or heated to a temperature sufficient to kill any pathogenic organisms or undesirable bacteria which may be present, e.g. 140°–212° F. Vent 157 is provided to vent gases or vapors driven off by virtue of the heating of the collected water, thereby removing undesirable tastes or odors which may be present in the water. The product water is thereafter passed through heat exchanger 152 and into storage tank 158 from which the water can be withdrawn for use, e.g. as drinking water, as desired.

In the refrigeration cycle, the refrigerant is compressed by compressor 141 and charged through line 143 and pasteurizer 156 to condenser coil 118. The hot refrigerant provides the heat source for pasteurizer 156. In coil 118, the refrigerant causes vaporization of the water sprayed against the coil in chamber 117. An intermediate tap in coil 118 directs partially condensed refrigerant to the compressor through line 159 and thence back to coil 118. In compressor 141, the refrigerant entering through line 159 is passed through a heat exchange tube in the compressor oil reservoir to cool the compressor oil by heat transfer with partially condensed refrigerant. Such cooling of the compressor oil may alternatively be accomplished, for example, by radiation of heat from the compressor shell. While in heat exchange with the compressor oil, the refrigerant is partially reheated to increase the amount of vaporization of water within chamber 117.

From coil 118, the refrigerant is passed through dryer 160, which is a desiccant type dryer including a chemical, e.g. silica gel, capable of removing moisture from the refrigerant in the sealed refrigerant circuit. Moisture tends to create corrosion problems when present with refrigerants and the corrosion problem is decreased by such drying of the refrigerant.

Thereafter the refrigerant is passed through restriction 142 and evaporated and directed through evaporator coil 120 for cooling and condensing water from the cyclic stream of air. From coil 120, the refrigerant is diverted through cooling coil 161 disposed within product storage tank 158 for cooling the product water, e.g., to drinking temperature about 45° F. The refrigerant is then returned to accumulator 162 which serves as a storage tank for refrigerant. Refrigerant is withdrawn from accumulator 162 and circulated through line 143 to the inlet or suction side of compressor 141 wherein the refrigerant is compressed and discharged for recycle.

It is evident that passing of product water leaving the pasteurizer in heat exchange with the incoming feed water in heat exchanger 152 cools the product water, thereby reducing the load on the cooling coil 161 in storage tank 158.

The water purifying device has been adapted for use in purification of hard water feed and accordingly uses lower operating temperatures in order to avoid scaling. The compressed refrigerant emerges from compressor 141 to coil 118 at a temperature of from 180° F. to 225° F. and preferably about 195° F. and is condensed in coil 118 to temperatures between 100° F. and 200° F. and preferably about 125°–135° F. the refrigerant passes through restriction 142 into the evaporating coil 120. The temperature of the refrigerant in the evaporator coil 120 should be at least 10 degrees lower than the temperature of the refrigerant in the condenser coil 118 and preferably at about 40° F. The heated air-water vapor mixture leaving chamber 117 is at about 115° F. while the cooled air-water vapor mixture leaving chamber 119 is at about 100° F.

Where cooling coil 161 is not provided, the operating conditions would probably provide the refrigerant at about 80° F. leaving restriction 142.

Figure 8:
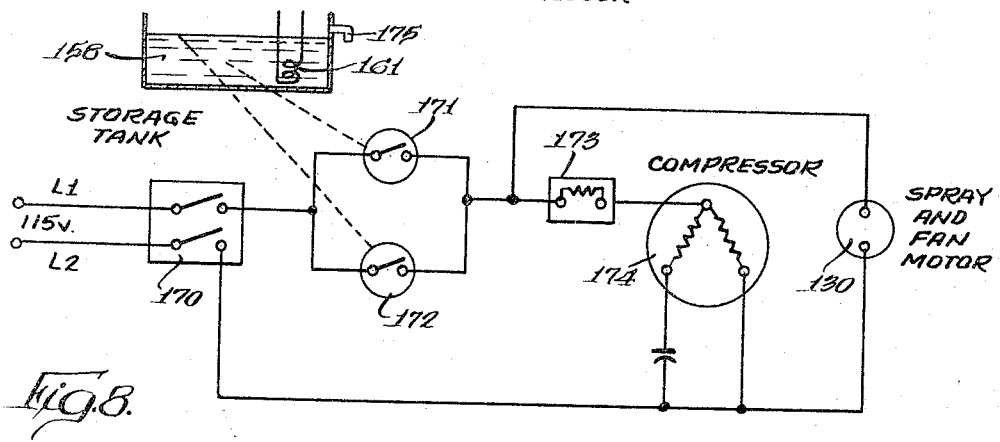
FIGURE 8 is a wiring diagram of suitable electric circuitry for use, for example, in the modified embodiment of FIGURE 7.

A schematic wiring diagram of suitable electrical circuitry for use in a device and method of this invention, e.g. for use with the modified embodiment of FIGURE 7, is provided in FIGURE 8.

The illustrated circuit is energized by a 115 volt alternating current source, as indicated, by means of "on-off" DPDT switch 170. Closing switch 170 places the compressor motor 174 and spray and fan motor 130 (corresponding to motor 30 in the embodiment described with reference to FIGURES 1–3) in circuitry to be controlled by either of switches 171 and 172, closure of either switch 171 or 172 effecting energization of motors 130 and 174. Switch 171 is a conventional temperature responsive switch which is actuated to close or open the circuit responsive to the temperature of the product in storage tank 158 while switch 172 is a conventional pressure responsive switch which is actuated to open or close the circuit responsive to the level of water in tank 158. Such switches are well known to the art and may be used in accordance with conventional application of such switches. The compressor motor 174 is also a conventional item and in the illustrated embodiment is an electric motor having a heavy starting load and provided with an overload circuit breaker 173.

It will be apparent from FIGURE 8 that the water purifier device is turned on and off in response to either storage tank water level or storage tank water temperature. Thus, as the water in storage tank 158 decreases below a minimum preselected range of water supply level, the purifying device is actuated by switch 172 to purify more water. Upon production of water in amounts to bring this tank level up to a predetermined level, usually above the minimum level, switch 172 opens and deenergizes the device. Additionally, where it is desired to maintain the temperature of the water in the storage tank for such purposes as use as drinking water, upon increase of the temperature of the water above a preselected maximum desired temperature or temperature range, switch 171 is closed and the purifier device is actuated to cool the water by means of coil 161. Switch 171 opens when the temperature in tank 158 is decreased to a desired temperature, usually below the preselected maximum. Although additional water is being processed during cooling of the water responsive to closure of switch 171, such additional water need not pose a problem for storage tank 158 in that storage tank 158 is provided with overflow means indicated schematically at 175 so that excess water is withdrawn for charging to waste or drainage or for recycle to feed water as may be desired.

It will be noted in the apparatus shown that an "open" gravity system is provided; that is, the system does not operate under vacuum and the feed water and condensate containers are both open top containers, i.e., not enclosed as they operate at ambient pressures. Furthermore, the flow from the condensate container to the storage container is basically a gravity flow eliminating the need for additional pumps.

Where the water supply is relatively soft, the operating temperatures disclosed above may be raised, e.g., 10°–20° F., as less scale would form in operation of the apparatus.

I claim:

1. Apparatus for purifying water comprising a condensing chamber, a heating chamber, a hollow condenser means in the condensing chamber, a hollow heat exchange means in the heating chamber, a refrigeration compressor, means connecting the heat exchange means to the high pressure side of the refrigeration compressor, means connecting the condenser means to the low pressure side of said refrigeration compressor, conduit means connecting said heat exchange means and condenser means for completing a series cyclic circuit with said compressor, expansion valve means in said conduit means between said heat exchange means and condenser means, feed water means for directing feed water into heat exchange contact with said heat exchange means at a rate for heating said feed water to an elevated temperature below boiling to increase the vaporization thereof, motor-driven means for carrying heated water vapor to a flow path toward said condenser means, said motor-driven means including rotationally driven blade means, said flow path being adapted to block flow of water droplets while permitting flow of hot water vapor into condensing contact with said condenser means, a feed water container for containing a body of heated feed water disposed for receiving any excess water from said feed water directing means, overflow means operatively associated with said feed water container for determining the level of water in said feed water container, means responsive to the temperature of the water in the feed water container to control the introduction of fresh feed water thereinto, trough means disposed for receiving condensate from said condenser means and means for conducting said condensate to a storage receptacle as product purified water.

2. The apparatus as claimed in claim 1 and having means for tapping off partially condensed refrigerant from said heat exchange means in said heating chamber, and reheating said partially condensed refrigerant by heat exchange with a heated portion of the refrigerating circuit for increasing the heat available from said heat exchange means within said heating chamber.

3. The apparatus as claimed in claim 1 and having means for pasteurizing said product purified water before entering said storage receptacle, and cooling means removing refrigerant from the evaporator and disposed in said storage chamber in heat exchange with the purified water therein adapted to cool the purified water below the temperature of the feed water.

4. The apparatus as claimed in claim 3 and having another heat exchange means for heat exchanging the feed water and the pasteurized product purified water before said pasteurized water flows into the storage chamber.

5. The apparatus for purifying feed water as claimed in claim 1 wherein said feed water means for directing feed water is an atomizer for atomizing the feed water directed into heat exchange contact with said heat exchange means.

6. Apparatus for purifying feed water comprising a heating chamber having a condenser coil of a refrigeration circuit around the inside thereof, a refrigeration compressor, a cooling chamber having an evaporator coil of said refrigeration circuit vertically disposed therein, said cooling chamber and said heating chamber being disposed about a common vertical axis, means connecting said condenser coil to the high pressure side of said refrigeration compressor, means connecting said evaporator coil to the low pressure side of said refrigeration compressor, conduit means connecting said condenser coil and said evaporator coil for completing a series cyclic circuit with said compressor, expansion valve means in said conduit means between said condenser coil and said evaporator coil, a feed water container communicating with said heating chamber for receiving feed water to be purified, means centrally disposed in said heating chamber for horizontally spraying water received from said feed water container into heat exchange contact with said condenser coil of said refrigeration circuit at a rate for heating said feed water spray to an elevated temperature to increase the vaporization thereof, means providing an air flow path for directing air from the heating chamber to the cooling chamber and back to said heating chamber, motor-driven impeller means for carrying heated water vapor along said air flow path means toward said cooling chamber, said impeller means and said feed water spraying means being mounted on a common axial rotary shaft, said air flow path means being adapted to block flow of water droplets while permitting flow of heated water vapor into condensing contact with said evaporator coil of said refrigeration circuit in said cooling chamber, said feed water container receiving any excess unvaporized feed water from said heating chamber for mixing with the feed water in the container, means operatively associated with said feed water container for determining the fixed level of water in said feed water container, trough means disposed for receiving condensate from said cooling chamber and means for conducting said condensate to a storage receptacle as product purified water.

7. Apparatus as claimed in claim 6 and having means responsive to a predetermined temperature level in the area of the heating chamber to control the rejection of heated feed water from the feed water container and for the introduction of fresh feed water into said feed water container to replace the rejected feed water.

References Cited by the Examiner

UNITED STATES PATENTS

| | | |
|---|---|---|
| 614,776 | 11/1898 | Stocker. |
| 2,018,049 | 10/1935 | Allen _____ 202—236 |
| 2,142,747 | 1/1939 | Fisher. |
| 2,441,361 | 5/1948 | Kirgan _____ 202—181 |
| 2,705,218 | 3/1955 | Canicoba _____ 202—206 |
| 3,055,810 | 9/1962 | Skow _____ 202—206 X |
| 3,214,351 | 10/1965 | Lichtenstein et al. ____ 202—185 |
| 3,234,109 | 2/1966 | Lustenader _____ 203—22 X |

FOREIGN PATENTS

K 24,930  12/1956  Germany.

NORMAN YUDKOFF, *Primary Examiner.*

F. E. DRUMMOND, *Assistant Examiner.*